Nov. 26, 1963 H. R. WIANT 3,112,388

BRAZING FIXTURE

Filed March 24, 1958 5 Sheets-Sheet 1

HERMAN R. WIANT

*INVENTOR.*

BY Alden D. Redfield
Warren Kunz

ATTORNEYS

HERMAN R. WIANT
INVENTOR.

BY Alden D. Redfield
Warren Kunz
ATTORNEYS

HERMAN R. WIANT
INVENTOR.

BY Alden D. Redfield
Warren Kunz
ATTORNEYS

HERMAN R. WIANT
INVENTOR.

BY Alden D. Redfield
Warren Kunz
ATTORNEYS

Nov. 26, 1963 H. R. WIANT 3,112,388

BRAZING FIXTURE

Filed March 24, 1958 5 Sheets-Sheet 5

HERMAN R. WIANT

INVENTOR.

BY Alden D. Redfield
Warren Kunz
ATTORNEYS

United States Patent Office 3,112,388

Patented Nov. 26, 1963

3,112,388
BRAZING FIXTURE

Herman R. Wiant, Beverly, Mass., assignor to Avco Corporation, Cincinnati, Ohio, a corporation of Delaware Filed Mar. 24, 1958, Ser. No. 723,557
6 Claims. (Cl. 219—85)

The present invention relates to an improved ceramic fixture that is well adapted for supporting stainless steel honeycomb panels during brazing and to a material and method for making such fixtures. More particularly, the invention concerns a material which may be simply and economically cast in the form of a fixture of intricate shape and design.

Although not limited to such applicataions, the present invention is particularly useful in the fabrication of stainless steel honeycomb panels such as used in the construction of modern high-speed aircraft. As aircraft speeds have increased, so have the skin temperatures that are encountered, the increase in operating temperatures being so marked that it is no longer feasible to build aircraft from more conventional materials such as aluminum. To illustrate, at Mach III, skin temperatures due to aerodynamic heating exceed 900° Fahrenheit at sea level, and even at 35,000 feet altitude are in excess of 500° Fahrenheit. To cope with such temperatures use of stainless steel for aircraft construction is obviously desirable but the high density of the material necessitates special design approaches. This has led to the evolution of stainless steel honeycomb panels which comprise a pair of spaced sheets of stainless steel securely brazed to an intervening reinforcing core having a honeycomb formation.

For maximum safety, fabricating techniques must be used that will guarantee substantially complete brazing of the components. The best known techniques in use today involve furnace brazing of the components by a silver brazing alloy, the process being performed in an argon atmosphere. The components are supported within the furnace by graphite fixtures which are quite expensive to produce and easily broken. Use of the graphite leads to numerous problems such as contamination of the components because of gases and moisture, occluded by the graphite, which are released during the brazing operation. Although it would be desirable to use a hydrogen atmosphere for its reducing effect, such is not possible because of the tendency of carbon in the presence of hydrogen to inhibit flow of the brazing alloy and to cause objectionable carburization of the steel components. Since a reducing atmosphere cannot be used, it is necessary to clean the components thoroughly prior to brazing. So exacting are the requirements in this respect that the parts must be maintained surgically clean to assure proper bonding of the brazing alloy.

These stringent requirements necessarily result in extremely high fabricating costs. Further, the rate of rejection during fabrication is often high. Because of their inherent construction, honeycomb panels cannot be repaired to any significant extent after brazing, necessitating practically flawless process control.

Through the use of the present invention, it is possible to make honeycomb panels much more economically than at present. The novel ceramic fixtures disclosed in this application may be used to support the components during furnace brazing in a hydrogen atmosphere since the hydrogen does not react with the fixtures. Further, the fixtures have substantially no tendency to release contaminants during the brazing operation. The absence of contaminants and the presence of a reducing atmosphere make the requirements for cleanliness less stringent, resulting in a substantial cost savings.

Briefly, the present invention comprises a fixture which is made from vitreous silicon dioxide particles bonded together by a silicon dioxide binder. Since the principal constituent of the entire fixture is silicon dioxide, it possesses practically a zero coefficient of thermal expansion and is extremely resistant to thermal shock. In fact, cracking of fixtures as a result of temperature change is practically unknown. The same characteristic makes the improved fixtures dimensionally stable.

The fixtures may be produced from a material comprising a vitreous silicon dioxide filler and a binder which includes as two of its principal components ethyl silicate and silicic acid. Before setting, the material may be readily cast in a mold having the shape of the honeycomb panel which is to be fabricated. After the material has set sufficiently to acquire green strength, it is dried and fired at high temperature to produce the finished fixture. During firing, the binder is converted to silicon dioxide which binds the vitreous filler particles tenaciously together, and diluents used in making the binder are evaporated.

A great advantage of the present method of making fixtures is that no machining of the fixtures is required. Instead, fixtures for panels of complicated shape can be readily made by casting techniques.

The invention also comprises an improved method of making large fixtures from smaller components which are separately cast from the preferred material.

In view of the foregoing it is an important object of the present invention to provide an improved fixture, and more particularly, a fixture which principally contains vitreous silicon dioxide.

It is also an object of the present invention to provide an improved casting material which may be used to produce improved fixtures.

A further object is the provision of a new method of making fixtures by casting them in the shape of an article which is to be fabricated.

Other objects of the invention are as follows:

(1) Provision of a fixture which is characterized by substantially zero thermal coefficient of expansion.

(2) Provision of a fixture which is extremely durable, free from warpage, and shock resistant.

(3) Provision of a fixture which may be used to support components in a brazing furnace having a hydrogen atmosphere.

(4) Provision of a method of making fixtures from vitreous silicon dioxide.

(5) Provision of a method which may be used to form fixtures into complex shapes, such as those having compound curves.

(6) Provision of a method of reprocessing and re-using old fixtures in the production of new fixtures comprising silicon dioxide as a principal constituent.

(7) Provision of a method of making ceramic fixtures of intricate design, such as fixtures defining slots and passageways.

(8) Provision of a method of making ceramic fixtures in which resistance heating wires are embedded.

The novel features that I consider characteristic of my invention are set forth in the appended claims; the invention itself, however, both as to its arrangement and method of fabrication, together with additional objects and advantages thereof, will best be understood from the following description of a specific embodiment when read in conjunction with the accompanying drawings, in which:

GENERAL DESCRIPTION

Figure 1:
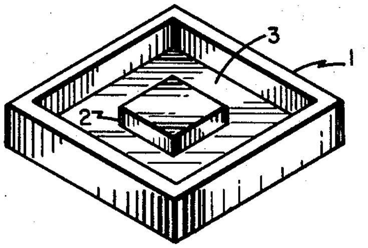
FIGURE 1 is a perspective view of a mold including a model of a honeycomb panel.

Fabrication of the novel fixture of this invention is accomplished by casting a siliceous mixture in a mold. In FIGURE 1 there is shown for illustrative purposes a simple rectangular mold 1 within which is provided a model 2 of a honeycomb panel which is to be fabricated. The casting mixture, which will be described more particularly later in this specification, completely fills the mold, including the channel 3 which surrounds the model. The mold may be made from any suitable non-porous material such as epoxy-base tooling plastics or metal. Porous materials, such as wood or plaster, may also be used but require a sealing coat to give them a non-porous surface. It is desirable for mold materials to be able to withstand temperature of at least 100° F. for a period of sixteen hours to permit heating of the mold and the as-cast material for drying purposes, as will be described later.

Figure 2:
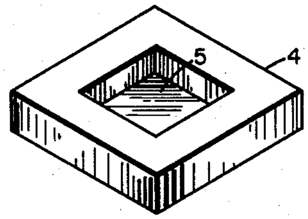
FIGURE 2 is a perspective view of a cast fixture made in the mold of FIGURE 1.

In FIGURE 2 is shown a finished fixture 4 made in the mold of FIGURE 1. It will be noted that the fixture has a centralized rectangular pocket 5 which corresponds in shape and size to the model 2 of the mold. The fixture is rigid and free of warpage so that the pocket accurately represents the exact configuration of the model.

Figure 3:
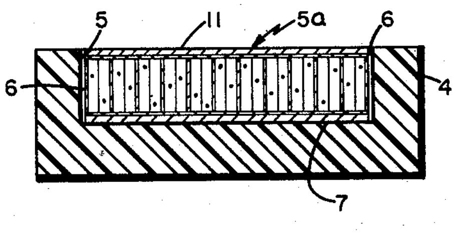
FIGURE 3 is a cross-sectional view of the fixture of FIGURE 2 showing the components of a honeycomb panel positioned within the fixture for brazing.

In FIGURE 3, the fixture 4 is shown in cross section. Within the pocket 5 are positioned the components and brazing alloy, generally designated 5*a*, for making a honeycomb panel corresponding to the model 2 of FIGURE 1. Although the fixture has substantially zero coefficient of thermal expansion and hence does not expand at brazing temperatures, the stainless steel components of the honeycomb do expand approximately .005 of an inch per inch during the heating cycle. For this reason, clearance must be provided at the ends of the components, as at 6.

Figure 4:
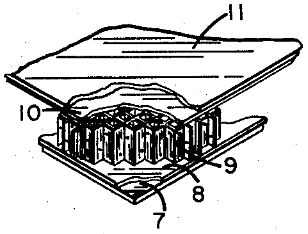
FIGURE 4 is a perspective view of the components with parts broken away to illustrate their relationship with each other.

Attention should now be directed to FIGURE 4 which shows the components of the honeycomb assembly in greater detail. A typical panel without edge supporting members comprises the following: outside wall 7; brazing foil 8; honeycomb reinforcing core 9; brazing foil 10; and inside wall 11.

The terms "outside" and "inside" have reference to the finished panel and its relative position when in use, particularly when installed in an aircraft structure, the "outside" wall forming the outside skin of the aircraft. Although dimensional variations of the inside wall are very slight in any event, it is desirable to fabricate the panel with the outside wall 7 immediately adjacent the surface of the fixture as shown in FIGURE 3. In this way the outside wall is made to conform closely to the exact shape of the fixture surface.

During the brazing process, the sheets of brazing foil 8 and 10 fuse and bond to the adjacent surfaces of the inside and outside walls and the honeycomb core. Since the walls are closely fitted to the core with less than .003 of an inch gap therebetween, uniform brazing of all adjacent surfaces is possible.

Figure 5:
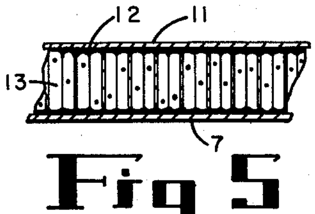
FIGURE 5 is a cross-sectional view through a brazed honeycomb panel.

Attention is now directed to FIGURE 5 which shows a cross section through a brazed honeycomb panel showing the presence of fillets 12 of brazing alloy securing the walls 13 of the honeycomb to the inner and outer walls 11 and 7. For aircraft use, practically perfect bonding of all portions of the honeycomb to the walls is necessary.

Figure 6:
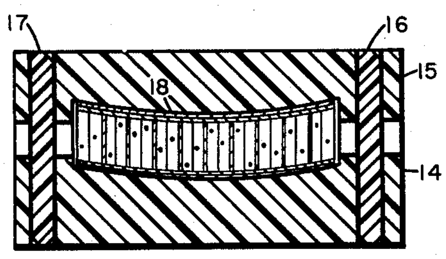
FIGURE 6 is a cross-sectional view through a pair of fixtures for positioning components of a curved honeycomb panel.
Figure 18:
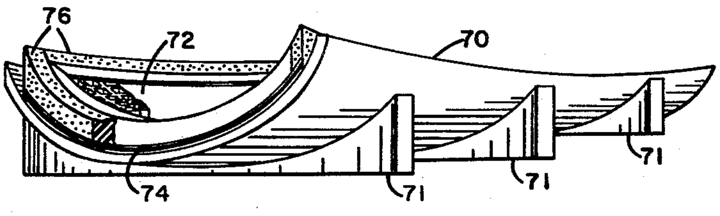
FIGURE 18 is a perspective view of a fixture for making a honeycomb panel having a compound curvature; and, FIGURE 19 is a cross-sectional view through a brazing box containing the fixture of FIGURE 18 with panel components ready for brazing.
Figure 19:
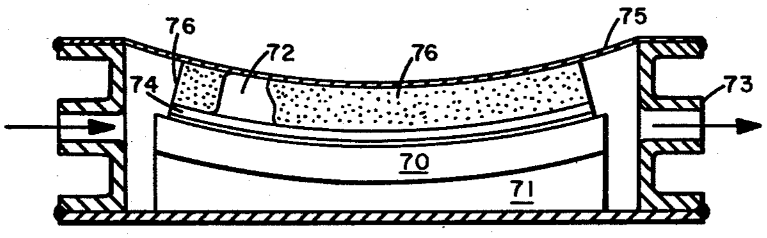

Panels may be made in different shapes. Although the panels of FIGURES 3–5 are simple planar panels, FIGURE 6 shows a section of a cylindrical panel, and FIGURES 18 and 19 show fixtures and components for fabricating large panels having compound curvatures. More will be said about the advantages of the present invention in making such complex panels later in this specification.

BRAZING PROCESS

An appreciation of the importance of the present invention can best be gained through an understanding of the brazing process to which the panel components are subjected.

The choice of brazing material depends in part upon the materials to be joined and their intended service. Typical stainless steel honeycomb panels may be made from 17–7 PH corrosion resistant, precipitation hardening stainless steel (AMS 5528: Chromium 16.0–18.0%; nickel 6.50–7.75%; aluminum .075–1.50%; carbon .09% max.; manganese 1.0% max.; silicon 1.0% max.; phosphorus .04% max.; sulphur .03% max.; remainder iron). For aircraft applications, the outside wall is usually .008 of an inch thick, whereas the inside is .005 of an inch thick. The core, which is usually made of the same material as the inside and outside walls, is formed from ribbon stock .0015–.002 of an inch thick. The ribbon stock is usually resistance welded into either hexagonal or square cells of approximately 3⁄16″ to ¼″ transverse dimension. By using the same materials for walls and core, problems incidental to differential thermal expansions are eliminated.

Panel components of 17–7 PH stainless steel can be readily brazed by a sterling silver brazing alloy having 92.5% silver, 7.3% copper, and 0.2% lithium. The lithium favors free flow of the alloy and fosters bonding to the components of the panel. Presence of the lithium eliminates the need for special fluxes. Brazing foil is usually about .002 of an inch thick.

Brazing may be conveniently done in a furnace. A hydrogen atmosphere is maintained around the components during the brazing cycle. Actual brazing of the components takes 5 to 15 minutes at a temperature of 1710°–1720° Fahrenheit. The brazing time depends upon the panel size and its configuration. At the end of the brazing period, the panel is cooled to 1400° F. and held there for 1½ hours, effecting the formation of carbide plus ferrite in the steel. The assembly is then cooled to 400° F. for transportation of austenite to martinsite, after which the panel is chilled to −20° F. to more completely transform any remaining austenite. Precipitation hardening may be accomplished by reheating the panel to 1050° F.

In the foregoing processing, only the 5 to 15 minute period at 1710–1720° F. is required for brazing. All subsequent steps serve the purpose of heat-treating the panel to develop its full strength and hardness. The heat treating steps are typical of those currently in use and are usually carried out while the components remain in the fixture and the hydrogen atmosphere to prevent warpage and oxidation.

Finished honeycomb panels are particularly desirable for aircraft applications because of their high strength-to-weight ratio even at elevated temperatures. Tensile strengths in excess of 100,000 p.s.i. can be developed in the face of the panel at temperatures as high as 800° F., and, at room temperature, panels may have a tensile strength as high as 175,000 p.s.i.

Important considerations in the fabrication of honeycomb panels are as follows:

(*a*) Proper relative positioning of the brazing alloy and stainless steel components.

(*b*) Correct positioning of the components adjacent the fixture.

(*c*) Maintenance of metal-to-metal contact between parts during brazing.

(*d*) Controlled heating and cooling of the fixture and components to prevent warpage and internal stresses.

(*e*) Provision of a protective atmosphere during the time that the components are subjected to elevated temperatures.

(*f*) Proper heat treatment of the panels after brazing.

In view of the fact that proper positioning of the brazing alloy and components is of major importance, it is customary to tack weld the panel together in a pre-assembly fixture before it is placed in the brazing fixture. In this way shifting of the components may be prevented. It will also be apparent that dimensional accuracy of the core is very important to maintain contact between the faces of the core and the walls of the panel.

During the brazing operation it is desirable to apply pressure to the panel assembly to maintain the face-to-face contact where brazing is to occur. In FIGURE 6 is shown a pair of fixtures 14 and 15 which are doweled together by pins 16 and 17 to assure correct alignment. Between the fixtures is a panel 18 which has a simple cylindrical curvature. Firm pressure on the panel may be assured by placing supplementary weights (not shown) on top of the fixture.

Figure 7:
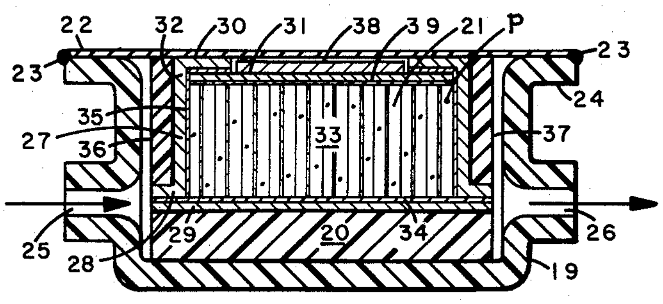
FIGURE 7 is a cross-sectional view through a brazing box containing a fixture and components in position for brazing.

A more desirable way of clamping the components in the fixture is illustrated by FIGURE 7 which shows a brazing box 19 on the bottom of which rests an improved fixture 20 made according to the teaching of this invention. Supported by the fixture are the panel components 21. Above the components is stretched a very thin sheet of stainless steel 22 which is completely welded along its edges, as at 23, to outwardly extending flange 24 of the brazing box. The brazing box also includes an inlet 25 and an outlet 26. Before the brazing box is placed in the furnace, hydrogen is introduced at 25 and exhausted at 26 to completely purge the box and its contents of air. Purging is facilitated by small perforations "*p*" formed in the walls of the core. These perforations also aid in equalizing gas pressures throughout the completed panel.

Before the brazing box is put into the furnace, the gas pressure is reduced to a relatively low value such as 4 p.s.i.a., and the low pressure hydrogen atmosphere is maintained within the box throughout the brazing and heat treating operations described above. Since a partial vacuum exists within the box, atmospheric pressure forces the sheet 22 tightly against the panel components and holds them securely against each other and against the surface of the fixture 20.

After processing of the panel has been completed, the welding bead 23 is ground off, releasing the panel from the brazing box. The brazing box may then be reloaded with a new set of components and the same sheet may again be welded in place.

Since the sheet 22 is a thin membrane, usually not in excess of .010 of an inch thick, it readily conforms to the surface of the panel components whether they be planar or curved. The same method of clamping the components is shown in FIGURE 19 in association with a compound curved panel.

It is desirable to incorporate edge members on the finished panels to facilitate assembly of the panels to a supporting framework and to make possible transfer of shear loads to the panels. As illustrated by FIGURE 7, such edge members may conveniently be formed in a Z-shaped cross section, indicated at 27. The Z member has a flange 28 which is brazed to wall 29, a flange 30 which is brazed to wall 31, and an intervening web 32 which is brazed to the side faces of the core 33. A sheet of brazing foil 34 extends between the wall 29 and the honeycomb core. This same sheet of foil extends completely under flange 28. Another sheet of brazing foil 35 lies adjacent web 32 and between flange 30 and wall 31. Still another sheet of brazing foil 39 is positioned above the core adjacent wall 31.

To clamp the edge members 27 during processing, ceramic blocks 36 and 37 are provided extending between the sheet 22 and the flange 28. Use of ceramic at this point is not necessary, however, and the clamping blocks may be made from stainless steel which is coated with benzated alumina to prevent sticking during the brazing operation.

A loose filler sheet 38 of stainless steel, coated with benzated alumina, is positioned above wall 31 to compensate for the thickness of flange 30. Uniform application of pressure to the panel is thus assured.

FIXTURE CASTING MATERIAL

Desiderata of an ideal brazing fixture are zero thermal expansion, dimensional stability, strength, economy, simplicity of fabrication, and absence of reaction with hydrogen. All of these characteristics are possessed by the novel fixtures made according to the present invention.

It has long been known that objects made from vitreous silicon dioxide have practically no thermal expansion; however, prior art processes for making objects of this substance have been unsatisfactory and have proved impractical. Through the use of the present invention, it is possible to make fixtures and other objects which are predominantly vitreous silicon dioxide and for this reason are possessed of the extremely low to non-existent thermal expansion of the parent material.

In the search for improved fixtures for honeycomb processing, consideration was early given to the use of ceramics. The ceramics investigated were, however, so difficult to fabricate and so sensitive to thermal cracking that they were soon discarded and use of ceramics was discredited as far as honeycomb processing was concerned.

Early attempts to make ceramic fixtures involved grinding them to final shape which was extremely expensive. In use, the life of a fixture was very short because of susceptibility to chipping, spalling and thermal cracking. Such fixtures also lacked dimensional stability and, all in all, were not practical.

In accordance with the present invention, a ceramic fixture can be readily produced by casting a mixture of a vitreous silicon dioxide filler and binder into a mold such as shown in FIGURE 1. Although the coarseness of the filler is not critical, it is normally chosen to insure high "green" strength and to promote a dense structure. High strength may be attained by using a filler comprising approximately 50% fines (material passing through a 200-mesh sieve) and 50% coarse (material passing through a 30 but retained on an 80-mesh sieve). A filler of 50% coarse and 50% fines may produce a surface which is excessively rough. This may be eliminated in the final fixture by initially coating the mold with a 325-mesh filler plus binder which is allowed to set before the principal mixture of filler and binder is poured into the mold.

The binder comprises ethyl silicate and its reaction products when mixed with hydrochloric acid, alcohol and water. The proportions of constituents used in making the binder may be varied, but it has been found in practice that a desirable composition lies between or includes the proportions of the following solutions:

*Solution No. 1*

This solution is prepared by mechanically mixing:

1000 ml. 40% ethyl silicate (40% $SiO_2$ by weight)
200 ml. 0.5 w/o hydrochloric acid (.005 g. HCl per gram of solution)
1000 ml. ethyl alcohol Mixing is continued until a temperature rise is noted. When the rise has reached a maximum, 2000 ml. of additional alcohol is added. The resulting solution contains 15 grams of $SiO_2$ per 100 ml. of binder.

*Solution No. 2*

This solution is prepared by mixing:

150 ml. water
10 ml. concentrated hydrochloric acid
250 ml. ethyl alcohol

To these constituents 1000 ml. of 40% ethyl silicate are added. The mixture is mechanically agitated until a temperature rise of approximately 20 to 30° F. above ambient temperature is noted. The resulting solution contains 31 grams of $SiO_2$ per 100 ml. of binder.

The hydrochloric acid acts as a catalyst for the hydrolysis of the ethyl silicate. The alcohol serves as a common solvent for the ethyl silicate and water which are not soluble in each other. The constituents of the binder are believed to react as follows:

$$\underset{\text{(Ethyl silicate)}}{Si(OC_2H_5)_4} + \underset{\text{(Water)}}{4H_2O} = \underset{\text{(Silicic acid)}}{H_4SiO_4} + \underset{\text{(Ethyl alcohol)}}{4C_2H_5OH}$$

It is believed that the binder is a mixture of the ethyl silicate and its reaction product, silicic acid $H_4SiO_4$. When the binder and filler are mixed, an adhesive siliceous dispersion results which effectively bonds the filler material together. The alcohol tends to evaporate after the material is cast, tending to concentrate the silicic acid which temporarily bonds the filler particles together. During firing of the casting, as explained later, any remaining alcohol is burned and the silicic acid is converted to $SiO_2$. Since both the filler itself and the end product of the binder are $SiO_2$, it will be understood that the resulting fixture has the desirable characteristics of pure silicon dioxide.

Prior to mixing, the binder is a thin liquid and the filler is a powdery substance. The ratio of filler material to binder by weight may be varied over a wide range without undue adverse effects. A median range is approximately 100 grams of filler (vitreous silicon dioxide) to 24 grams of binder having approximately 15% silicon dioxide content. By mixing, an adhesive mass is formed which may be poured into a mold, such as illustrated in FIGURE 1. After pouring, the material is vibrated at about 60 cycles per second to eliminate entrapped air and to provide a part which is uniform throughout. The ratio of filler to binder is adjusted so that the mixture just flows under vibration.

As soon as mixed, the binder and filler start to set and gradually acquire "green" strength. The necessary time for acquiring sufficient strength to permit a fixture to be removed intact from a mold is a function of the temperature to which it is subjected, the alkalinity of the mixture, and the particular proportions of the mixture that have been chosen. Set-up time can be reduced by heating the fixture and mold, and for this reason the mold should be able to withstand 100° F. for a period of about sixteen hours, being a typical average set-up time. By addition of an agent that increases the alkalinity of the mixture, set-up times can be markedly reduced. For instance, by the addition of ½% by weight of 300-mesh magnesia (MgO) to the filler, the set-up time, i.e., time required for the material to lose its fluency, can be reduced to as little as one minute. With such a fast set up time, however, from 30 to 120 minutes additional time should be provided to assure that sufficient "green" strength is developed to permit removal of the fixture from the mold without damage. Generally speaking, the coarser the grade of filler, the longer is the time required for acquiring "green" strength.

Removal of the partially completed fixture from the mold can be facilitated by use of a parting compound, typical of which is a mixture of 50% petroleum jelly and 50% kerosene which may be lightly spread on the mold surfaces prior to casting of the fixture material.

After removal from the mold, a drying period is provided. This may be accomplished by air drying for about 24 hours or furnace drying for half an hour during which time the furnace temperature is gradually raised from room temperature to about 400° F.

The fixture in the "green" state has sufficient strength to permit normal handling. While the fixture is in such condition, thermocouples and similar devices may be inserted since the fixture may be readily worked by hand or power tools.

The fixture may be completed by firing in an air atmosphere at 1750° F. The resulting fixture is hard and smooth and is possessed of all of the desirable qualities mentioned earlier in this specification. Because the fixture does not expand with temperature increase, it may be moved from a region of room temperature to one at 2000° F. without fear of cracking or spalling. Absence of thermal expansion also makes it possible to cast sharp corners in the fixture which otherwise could not be tolerated in a cast fixture.

The casting material has the property of adhering tenaciously to porous surfaces. For this reason it is possible to grind up used fixtures for use as a coarse aggregate in large fixtures, Such aggregate promotes high strength in the final fixture and reduces any shrinkage tendency that might be present in a large fixture. The possibility of re-using the fixture materials promotes over-all economy.

At this point it is well to note that the use of Solution No. 1 produces a casting with little or no tendency to warp. In fact, use of Solution No. 1 with a filler containing no magnesia produces a casting which is entirely free from warpage. The use of Solution No. 2 produces high green strength and promotes very high thermal shock resistance with a slight tendency toward warpage. It will be apparent that a binder may be chosen that will favor the particular characteristic of the fixture which is of most importance, i.e., high green strength, high thermal shock resistance, freedom from warpage. By variation of the proportions of the binder constituents, specific characteristics can be accentuated.

FIXTURE DESIGN

Inasmuch as the fixtures are cast, they may be readily formed into complicated shapes. This is a most important advantage since fixtures frequently are complex in shape, having compound curvatures such as shown in FIGURE 18. The importance of this advantage will be appreciated fully when it is realized that prior art fixtures, such as graphite fixtures, are usually machined to shape. Thus, whereas each individual graphite fixture must be separately machined, many fixtures may be made from a given mold using the teaching of this invention.

Figure 8:
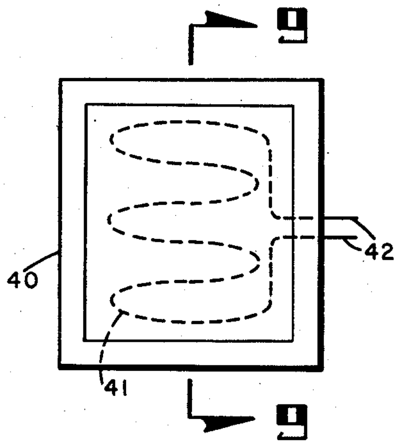
FIGURE 8 shows to a reduced scale a fixture including embedded electrical heating wires.

Since the fixtures are cast, electrical resistance heating wires may be embedded directly in the fixture. Thus, in FIGURE 8, a fixture 40 is shown having a continuous electrical resistance wire 41 embedded in it. Electrical energy may be supplied to the heating wire through leads 42.

Figure 9:
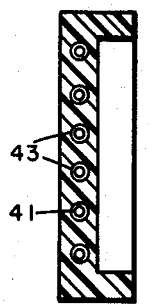
FIGURE 9 is a cross-sectional view of the fixture taken on plane 9—9 of FIGURE 8.
Figure 10:
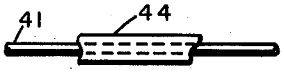
FIGURE 10 is a side view of an electrical resistance heating wire with a volatile coating as prepared for placement in a fixture.
Figure 11:
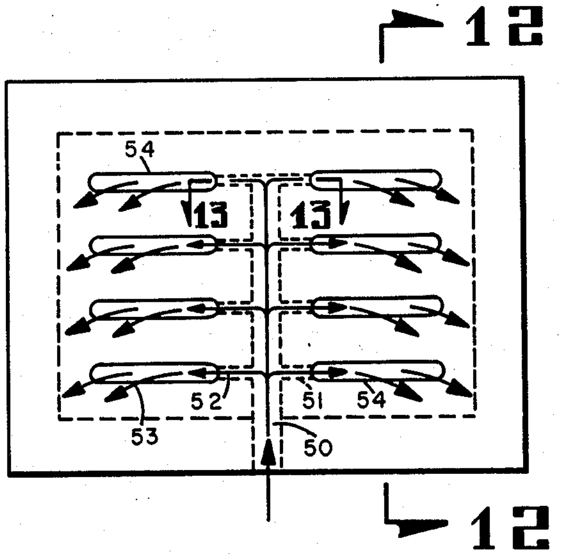
FIGURE 11 shows a fixture with molded cooling slots.
Figure 13:
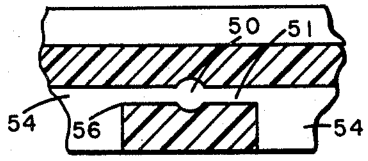
FIGURE 13 is a fragmentary cross-sectional view through adjacent cooling air slots taken on plane 13—13 of FIGURE 11.
Figure 12:
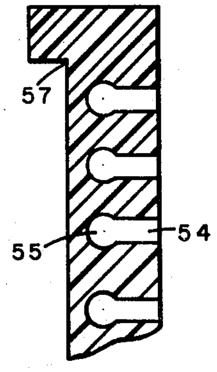
FIGURE 12 is a cross-sectional view taken on plane 12—12 of FIGURE 11.

FIGURE 9 shows a cross section of the heating wires embedded in the fixture. It will be noted that an air space 43 is provided around each of the heating wires. This may be readily accomplished by coating the wires 41 with acryloid resin, such as indicated at 44 in FIGURE 10, prior to embedding the wire into the amorphous material of the fixture. During firing of the fixture the resin decomposes leaving the heating element within an air space which accommodates differential expansions and contractions of the wire relative to the fixture.

The provision of integral resistance wires makes it possible to preheat the fixture prior to brazing and to reduce the time required for the fixture to attain brazing temperature while the fixture and its components are in the brazing furnace. For high volume production, this is a desirable feature since it offsets to a large extent the insulating characteristics of the fixture material.

In order to accelerate cooling of the fixture, cooling gas channels may be cast directly into the fixture, such as illustrated by FIGURES 11 through 14. Directing attention first to FIGURE 11, a cylindrical conduit 50 is shown connected to a plurality of lateral feeders 51. Through the conduit and feeders cooling gas may be supplied as suggested by the arrows 52. The cooling gas (which may be hydrogen) from the feeders 51 (see arrows 53) is vented from the fixture through a plurality of slots 54. The relationship of the channel feeder and slots is illustrated particularly well by FIGURE 13.

Each of the slots 54 may have the cross-sectional shape of a keyhole, including an enlargement 55 which is directly in line with the associated feeder 51. The keyhole shape is desirable from the standpoint of the structural strength of the resulting fixture, although other shapes may be used. The slots may be formed by casting the fixture about disposable cores, such as wood fiber, which may be removed after the fixture is fired.

Figure 14:
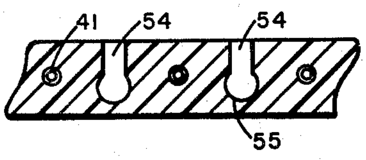
FIGURE 14 is a cross-sectional view through a modified fixture including both heating wires and cooling air slots.

As illustrated by FIGURE 14, both the resistance wire 41 and slots 54 may be used simultaneously in a given fixture.

Thus, supplementary means, such as resistance heating wires or cooling gas, may be used to accelerate temperature changes of the fixture. Since the fixture is made of a relatively light material and is not very massive, it has a relatively low thermal mass, and heating and cooling of the fixture is not a serious problem.

In connection with FIGURES 11 through 14, it will be noted that the fixture may be cast with sharp corners, such as suggested at 56 and 57. The absence of thermal expansion makes this permissible since stress concentration and thermal cracking at the corners will not occur. This obviously simplifies fixture manufacture and reduces cost.

Figure 15:
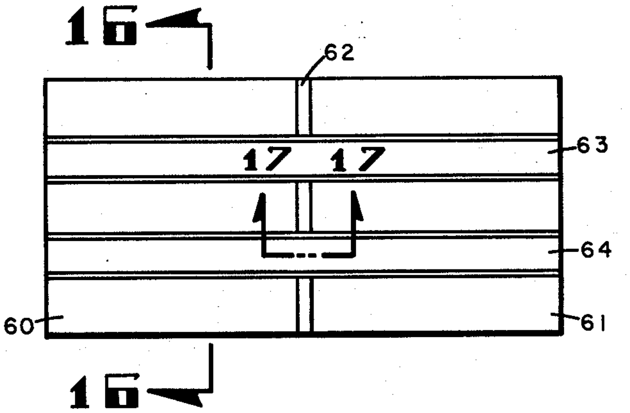
FIGURE 15 shows to reduced scale a composite fixture formed by cementing a plurality of fixture components together.
Figure 16:
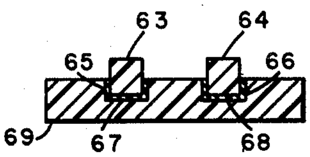
FIGURE 16 is a cross-sectional view of the composite fixture taken on plane 16—16 of FIGURE 15.
Figure 17:
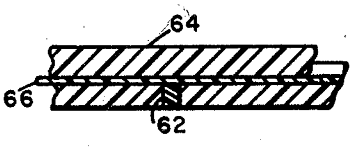
FIGURE 17 is a fragmentary cross-sectional view of the composite fixture taken on plane 17—17 of FIGURE 15.

Large fixtures may be readily fabricated in sections as illustrated by FIGURE 15. Here two sections of a fixture, 60 and 61, are joined by an intervening layer of material 62. The sections are also strengthened by structural members 63 and 64.

Sections 60 and 61, as well as supports 63 and 64, are separately fabricated. At the time the sections 60 and 61 are formed, grooves 65 and 66 are cast in them to accommodate the supports 63 and 64. When the composite fixture, the bottom of which is shown in FIGURE 15, is assembled, the preformed components are joined by additional fixture material which is provided at 62 and around the supports at 67 and 68. Since the fixture material bonds securely to porous surfaces, the resulting composite fixture has great strength and presents a uniform surface 69 for supporting panels during brazing.

Attention is now directed to FIGURE 18 which shows a fixture comprising a supporting member 70 to which is attached a plurality of supporting legs 71. This type of fixture may also be a composite, the supporting member and the legs being cast separately and cemented together by application of fixture material. Attention is called to the fact that the fixture of FIGURE 18 has a compound curvature being curved in all three dimensions. Resting upon the fixture are honeycomb panel components 72 which are firmly supported for the brazing operation. Where compound curves are involved, it is usually necessary to prestretch the inner and outer wall members of the panel prior to being assembled and placed in the fixture. In other words, the fixture is not normally required to constrain the stainless steel components in their curved configuration. Of course, where relatively small curvatures and small panels are involved, as in FIGURE 6, the fixtures themselves may be relied upon for forming the components.

FIGURE 19 resembles FIGURE 7 in disclosing a brazing box 73 within which is positioned the fixture of FIGURE 18. A pressure sheet 75 is welded to the brazing box for applying pressure to the components 72 and holding them securely against the fixture. The presence of edge supporting bars 76 will also be noted to hold edge members 74 of the panel in position during brazing.

CONCLUSION

In view of the foregoing description of the invention it will be appreciated that it provides a very simple and economical way of forming fixtures even though they have complex shapes and include auxiliary design features such as air flow channels and heating wires. The fixtures require no machining and are readily suited for use in making honeycomb panels. It is important to note that the fixtures do not react with hydrogen and may be used with a hydrogen atmosphere in a brazing furnace. Since the hydrogen is capable of reducing oxides, cleanliness requirements are not as stringent as in prior art processes using an argon atmosphere.

The fixtures may be readily cast from materials which are easily obtained at modest cost. Further, the fixtures may be reprocessed and re-used. These characteristics, plus the durability of the fixtures themselves, promote over-all processing economy.

The varius features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In a fixture for supporting during brazing and cooling the components of a honeycomb reinforced panel in situ, a base portion and upstanding side wall portions integral therewith, said base and side wall portions having inner surfaces which form a recess for receiving said honeycomb reinforced panel, said base and said side wall portions being principally cast and fired vitreous silicon dioxide particles bonded by crystalline silicon dioxide, the inner surface of said base portion corresponding to the final configuration intended for said honeycomb reinforced panel; and means for holding said honeycomb reinforced panel in engagement with the inner surface of said base portion, said base portion also including cooling gas slots through which gas may be conducted to cool the fixture and panel after brazing.

2. In a fixture for supporting during brazing and cooling the components of a honeycomb reinforced panel in situ the combination comprising: a base portion and upstanding side wall portions integral therewith, said base and side wall portions having inner surfaces which form a recess for receiving said honeycomb reinforced panel, said base and said side wall portions being comprised of cast and fired vitreous silicon dioxide particles, the inner surface of said base portion corresponding to the final configuration intended for said honeycomb reinforced panel; means for holding said honeycomb reinforced panel in engagement with the inner surface of said base portion; and an electrical resistance heating wire cast within said base portion for heating said fixture and panel, said base portion also including cooling gas slots through which gas may be conducted to cool the fixture and panel after brazing.

3. In a fixture for supporting during brazing and cooling the components of a honeycomb reinforced panel in situ the combination comprising: a base portion and upstanding side wall portions integral therewith, said base and side wall portions having inner surfaces which form a recess for receiving said honeycomb reinforced panel, said base and said side wall portions being comprised of cast and fired vitreous silicon dioxide particles and a crystalline silicon dioxide binder, the inner surface of said base portion corresponding to the final configuration intended for said honeycomb reinforced panel; means for holding said honeycomb reinforced panel in engagement with the inner surface of said base portion; and an electrical resistance heating wire cast within said base portion for heating said fixture and panel, said base portion also including cooling gas slots through which gas may be conducted to cool the fixture and panel after brazing.

4. In a fixture for supporting during brazing and cooling the components of a stainless steel honeycomb reinforced panel in situ the combination comprising: first and second members each having a base portion and upstanding side wall portions integral therewith, said base and side wall portions of each said member having inner surfaces which form a recess for receiving the components of said honeycomb reinforced panel in a predetermined relationship, said base and said side wall portions being cast and fired and principally comprised of vitreous silicon dioxide particles bonded by crystalline silicon dioxide, the inner surfaces of said base portions corresponding to the final configuration intended for said honeycomb reinforced panel; means for maintaining the inner surfaces of said base portions in engagement with said honeycomb reinforced panel to form said final configuration; and an electrical resistance heating wire cast within said base portion for heating said fixture and panel, said base portions also including cooling gas slots through which gas may be conducted to cool the fixture and panel after brazing.

5. A composite brazing fixture for supporting stainless steel honeycomb reinforced panels to be subjected to brazing temperatures comprising cast and fired vitreous silicon dioxide particles joined together by silicon dioxide and a siliceous binder and an electrical resistance heating wire integrally cast therewithin for heating said fixture and the panels contained therein during brazing.

6. A composite brazing fixture for supporting stainless steel honeycomb reinforced panels to be subjected to brazing temperatures comprising cast and fired vitreous silicon dioxide particles joined together by silicon dioxide and a siliceous binder, an electrical heating wire integrally cast therewithin for heating said fixture and the panels contained therein during brazing, and cooling gas slots also contained therein through which cooling gas may be conducted to cool the fixture and structure after brazing.

References Cited in the file of this patent

UNITED STATES PATENTS

| | | |
|---|---|---|
| 554,910 | Delany | Feb. 18, 1896 |
| 1,030,641 | Braden | June 25, 1912 |
| 1,476,116 | Thompson | Dec. 4, 1923 |
| 2,035,707 | King | Mar. 31, 1936 |
| 2,077,305 | Batchell | Apr. 13, 1937 |
| 2,095,807 | Gier | Oct. 12, 1937 |
| 2,303,555 | Humphrey | Dec. 1, 1942 |
| 2,419,848 | Morey | Apr. 29, 1947 |
| 2,552,999 | Pannell et al. | May 15, 1951 |
| 2,614,517 | Peterson | Oct. 21, 1952 |
| 2,684,503 | Silver | July 27, 1954 |
| 2,693,636 | Simpelaar | Nov. 9, 1954 |
| 2,799,693 | Dodgson | July 16, 1957 |
| 2,801,603 | Reichelt | Aug. 6, 1957 |

FOREIGN PATENTS

| | | |
|---|---|---|
| 4,017 | Great Britain | Feb. 16, 1914 |

OTHER REFERENCES

"The Condensed Chemical Dictionary," Fourth Edition, Reinhold Publishing Co., 330 W. 42nd Street, New York, 1950, page 594.